(12) United States Patent
Lenharth et al.

(10) Patent No.: US 8,132,181 B2
(45) Date of Patent: Mar. 6, 2012

(54) METHOD, APPARATUS AND MEDIA FOR INDICATION MANAGEMENT IN AN INFORMATION MODEL ENVIRONMENT

(75) Inventors: Scott Lenharth, Austin, TX (US); Vance Corn, Austin, TX (US); John Dodson, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 1044 days.

(21) Appl. No.: 11/565,615

(22) Filed: Nov. 30, 2006

(65) Prior Publication Data

US 2008/0134208 A1 Jun. 5, 2008

(51) Int. Cl.
  G06F 3/00 (2006.01)
  G06F 9/44 (2006.01)
  G06F 9/46 (2006.01)
  G06F 13/00 (2006.01)
(52) U.S. Cl. ........................................... 719/318
(58) Field of Classification Search .................. 719/318
  See application file for complete search history.

(56) References Cited

U.S. PATENT DOCUMENTS

| | | | |
|---|---|---|---|
| 6,367,034 B1 * | 4/2002 | Novik et al. ................. 714/39 |
| 6,427,168 B1 | 7/2002 | McCollum | |
| 6,871,346 B1 | 3/2005 | Kumbalimutt et al. | |
| 7,412,501 B2 * | 8/2008 | Sanghvi et al. ............... 709/223 |
| 2002/0019886 A1 * | 2/2002 | Sanghvi et al. ............... 709/318 |
| 2003/0217195 A1 | 11/2003 | Mandal et al. | |
| 2004/0006652 A1 * | 1/2004 | Prall et al. .................... 709/318 |
| 2005/0278354 A1 * | 12/2005 | Gupta et al. .................. 707/100 |
| 2005/0283553 A1 * | 12/2005 | Droba .......................... 710/200 |

FOREIGN PATENT DOCUMENTS

| EP | 1 026 867 A2 | 12/1999 |
|---|---|---|
| WO | WO 2004/002062 A1 | 12/2003 |

OTHER PUBLICATIONS

Distributed Management Task Force, CIM Event Model White Paper, Distributed Management Task Force, Inc., 2003, pp. 1-28.*
Sun Microsystems, Solaris WBEM Developer's Guide, Sun Microsystems, Inc., pp. 1-184.*
HP, EVM CIM Provider—CIM Indication Provider for events from the Event Manager, Jan. 2006, pp. 1-9.*
Sun Microsystems, Solaric WBEM Developer's Guide, Sun Microsystems, Inc., Jan. 2005, pp. 1-184.*

* cited by examiner

*Primary Examiner* — Diem Cao
(74) *Attorney, Agent, or Firm* — Garrana Tran LLP; Andrea E. Tran

(57) ABSTRACT

A computer implemented method for managing an information handling system. The method may include one or more of: monitoring, with an object oriented model, the information handling system for an event; generating, with the object oriented model, an indication in response to the event; and/or allowing access to the indication to clients having a sufficient client level of access.

16 Claims, 2 Drawing Sheets

METHOD, APPARATUS AND MEDIA FOR INDICATION MANAGEMENT IN AN INFORMATION MODEL ENVIRONMENT

BACKGROUND

1. Technical Field

The present disclosure relates generally to information handling systems, and more particularly to indication management in an information model environment.

2. Background Information

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As the capabilities, diversity, and size of computer systems and networks continue to increase, the complexity of system management also increases. As a tool for managing information handling systems, the Common Information Model or "CIM" is a standard that defines how managed elements in an IT environment are represented as a common set of objects and relationships between them. There are a number of CIMs that are available, most notably those by the Distributed Management Task Force (DMTF), and the Storage Networking Industry Association (SNIA).

Developing and unifying management standards for desktop, enterprise and Internet environments is a main goal of DMTF, a non-profit, vendor-neutral collaborative body, that is leading the development, adoption and unification of management standards and initiatives for desktop, enterprise and Internet environments. DMTF is chartered to adopt, create and maintain the specifications and technologies that provide management tools that deploy, discover and control management data in a standard way.

DMTF standards are platform-independent and technology neutral, and facilitate cost effective system management. The DMTF's CIM standard is an object-oriented management information model that unifies and extends existing management standards such as SNMP, DMI, and CMIP.

In a CIM environment, the occurrence of an event is represented by an indication. With current CIM standards, a client is able to subscribe to potentially any indication of a system, as the current CIM standards do not allow a provider to determine if a client has the necessary security clearance to consume an indication, nor do they allow providers to require that a client have security clearance in order to consume an indication. Thus, a situation may arise where a client lacking the necessary security clearance to access a resource may nonetheless subscribe to and receive indications for that resource.

Currently, the providers are also unable to prioritize indications by current CIM standards. The current CIM standards also do not provide a mechanism for either a client or a provider to combine indications for delivery. Indications regarding routine matters are provided with the same priority as indications regarding catastrophic matters.

SUMMARY

The following presents a general summary of some of the many possible embodiments of this disclosure in order to provide a basic understanding of this disclosure. This summary is not an extensive overview of all embodiments of the disclosure. This summary is not intended to identify key or critical elements of the disclosure or to delineate or otherwise limit the scope of the claims. The following summary merely presents some concepts of the disclosure in a general form as a prelude to the more detailed description that follows.

According to one non-limiting embodiment there is provided a computer implemented method for managing an information handling system. The method may include one or more of monitoring, with an object oriented model, the information handling system for an event; generating, with the object oriented model, an indication in response to the event; and/or allowing access to the indication to clients having a sufficient client level of access.

According to another non-limiting embodiment there is provided a computer implemented method of managing an information handling system. The method includes on or more of: monitoring, with an object oriented model, the information handling system for an event; and/or generating, with an object oriented model, an indication in response to the event wherein the indication comprises a priority for the event.

According to another embodiment there is provided a computer implemented method of managing an information handling system. The method includes one or more of monitoring, with an object oriented model, the information handling system for an event of a first type; generating, with an object oriented model, an indication in response to the event, repeating the steps of monitoring and generating until satisfaction of preset criteria, with each indication of step B gathered into a single bundle; and/or allowing clients access to the bundle.

BRIEF DESCRIPTION OF THE DRAWINGS

The following drawings illustrate some of the many possible embodiments of this disclosure in order to provide a basic understanding of this disclosure. These drawings do not provide an extensive overview of all embodiments of this disclosure. These drawings are not intended to identify key or critical elements of the disclosure or to delineate or otherwise limit the scope of the claims. The following drawings merely present some concepts of the disclosure in a general form. Thus, for a detailed understanding of this disclosure, reference should be made to the following detailed description, taken in conjunction with the accompanying drawings, in which like elements have been given like numerals.

DETAILED DESCRIPTION

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic: ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

The present disclosure has utility with information models for IHS system management. Various embodiments of the present disclosure are illustrated by reference to CIM, although it should be understood that the present disclosure is not to be limited to use with CIM but may be used with any information model as applicable.

Figure 1:
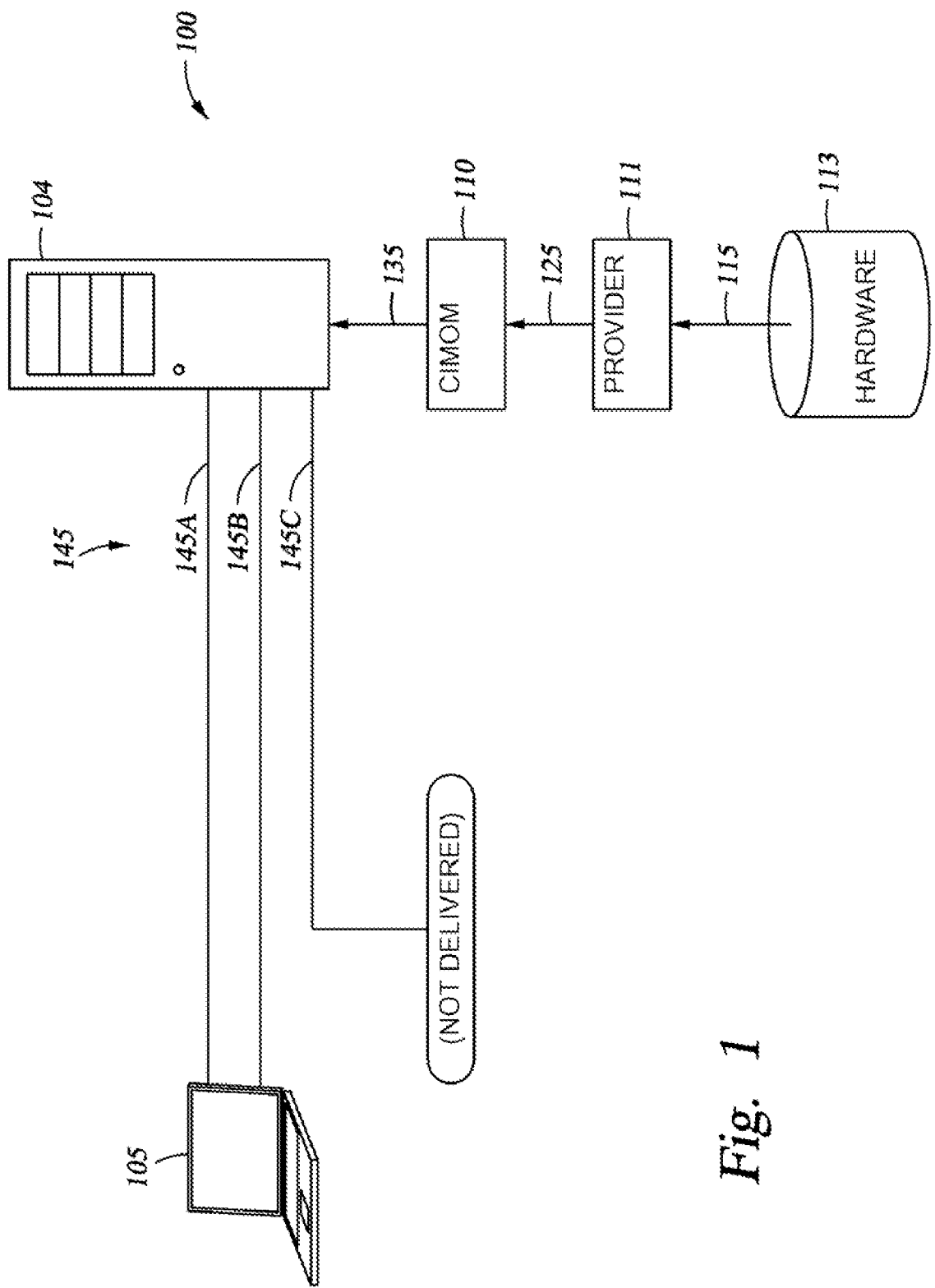
FIG. 1 is a schematic representation of one non-limiting embodiment of data flow involving an information handling system (IHS).

Referring now to FIG. 1, there is provided a schematic representation of a non-limiting embodiment of an IHS showing data flow for an event communicated through a CIMOM to a client application. The methods, apparatus, and products of the present disclosure enable a provider to control access to an indication or a collection of indications. By other names, this may also be known as privilege or security. Methods, apparatus, and products for controlling access are well known to those of skill in the art and may be utilized here. Access control to indications is lacking in CIM, and the present disclosure is not limited to any particular type of access control, as any may be utilized to control access to indications.

As one embodiment, only those clients possessing the necessary security clearance for an indication are allowed to consume the indication. As another embodiment, only those clients identified on a particular privilege list may be allowed access to the indication.

In other non-limiting embodiments, the methods, apparatus, and products of the present disclosure enable a provider to assign priorities to indications. In even other non-limiting embodiments, the method, apparatus and products of the present disclosure allow either a client or a provider to group indications such that the grouped indications are sent together as a bundle rather than one indication at a time.

As shown in FIG. 1, IHS 100 may include server 104, client application 105, CIMOM 110, provider 111, and hardware 113. A CIMOM is a component in the CIM server that handles the interaction between management applications and providers. The CIMOM supports services such as event notification, remote access, and query processing. Certainly, each of these hardware/software components is well known to those of skill in the art. The present disclosure is not meant to be limited to the embodiment of FIG. 1, but rather includes any IHS configuration which communicates an event to a client.

Hardware 113 may communicate an event 115 to provider 111, which in turn may communicate event 115 as indication 125 to CIMOM 110. CIMOM 110 communicates this indication 125 as indication 135 to server 104. Server 104 then generates indication 145 for client application 105, which may be in the form of high priority indication 145A, low priority indication 145B, or highly secure indication 145C. It should be understood that any of the communications may be through physical connections and/or wireless, and through any type of network.

In the present disclosure, CIM may be utilized to provide a conceptual view of IHS 100. CIM is a hierarchical, object-oriented architecture organized to track and depict the complex interdependencies and associations among different managed objects of IHS 100. Such interdependencies may include those between logical network connections and underlying physical devices, or those of an e-commerce transaction and the web and database servers from which they depend.

At its very core, CIM is comprised of a specification and a schema. The CIM specification defines the details for integration with other management models, while the CIM schema provides the actual model descriptions. The CIM schema captures notions that are applicable to all common areas of management, independent of implementations.

The CIM specification defines the syntax and rules of the model and how CIM can be integrated with other management models, while the CIM schema comprises the descriptions of the models. The CIM schema currently defines thousands of classes with properties and associations that represent components of a system such as, but not limited to, fans, power supplies, processors, and firmware. The CIM schema class definitions also include methods. The classes are organized by namespaces that function as logical databases. Profiles are specifications that define the CIM model and associated behavior for a management domain. The profiles define requirements regarding the classes and associations used to represent the management information in a given management domain.

The underlying CIM framework may be built upon through the use of CIM extensions. These extensions are another part of the CIM Schema, and may include platform-specific extensions of the CIM Schema. Extension schemas represent technology specific extensions of the common schema. By utilizing extensions, CIM may be expanded from the basic model class and associations. Extending the CIM or a proprietary schema may mean adding a property to an existing class/subclass of the CIM or a proprietary schema, or adding a method.

The present disclosure provides a number of extensions to the existing CIM model, non-limiting examples of which include extensions which allow a client or provider, such as client 105 or provider 111: (1) to assign priorities to certain indications, such as indications 145A; (2) to group indications of a certain type, such as indications 145B that will be sent together; and/or (3) to set a certain privilege level for an indication or collection of indications, such as indications 145C.

It should be understood that the present invention provides new extensions to the existing CIM and various embodiments of this disclosure provide specific names for those new extensions. It should be further understood that the extension names utilized in the present disclosure were arbitrarily selected for this disclosure within the rules of the existing CIM. The present disclosure is not intended to be limited to any particular name for any particular extension. Rather, focus is to be directed to the function and operation of the extension with the understanding that any name may be utilized. Thus, names selected for the new extensions are illustrative and are not intended to limit the scope of the specification and claims of the present disclosure.

As an extension to the CIM schema, one new CIM class, Class 1, provided by the present disclosure is arbitrarily referred to herein as CIM_IndicationAccessControl. Generally, two instances of this class may be associated with a filter representing an indication. A first instance of CIM_IndictionAccessControl associated with the filter may comprise a property that defines the level of access assigned to the indication (indication level of access) a client must possess (client level of access) in order for the client to receive the indication. Another instance of CIM_IndicationAccessControl associated with the filter may comprise a property that lists the current level of access possessed by a client (client level of access) attempting to access the indication. This client level of access may be derived by any applicable external authentication mechanism known in the art.

A second new CIM class provided by the present disclosure Class 2, is referred to herein as CIM_IndicationQualityOfService. Generally an instance of this class may be associated with one or more filters representing indications. CIM_IndicationQualityOfService instances comprise a property determining the relative priority with which a provider handles the indication. It is recognized that any type of priority scheme may be utilized. One possible scheme may include descriptive categories such as low, average, medium, high, and urgent. Another scheme may include color categories such as green, yellow and red. Even another non-limiting scheme may include numerical categories scheme ranging from a low value to a high value, for example, 1-3, 1-5, 1-10, 1-100. CIM_IndicationQualityOfService instances may also comprise a property that determines the maximum time delay, generally in milliseconds, before delivery of indications that are grouped together.

In a CIM environment, the occurrence of an event, such as 115 is represented by an indication, which may also be indication 125, 135 or 145 depending upon where reference is made in IHS 100. An event, such as indication 115, may be any change relating to the IHS. The present disclosure is not limited to any type of event, as is should be understood the even definition event will generally be provided by the end user. As a non-limiting example, an event may be defined as a change in the state of the environment, or a record of behavior of a component of IHS 100.

Figure 2:
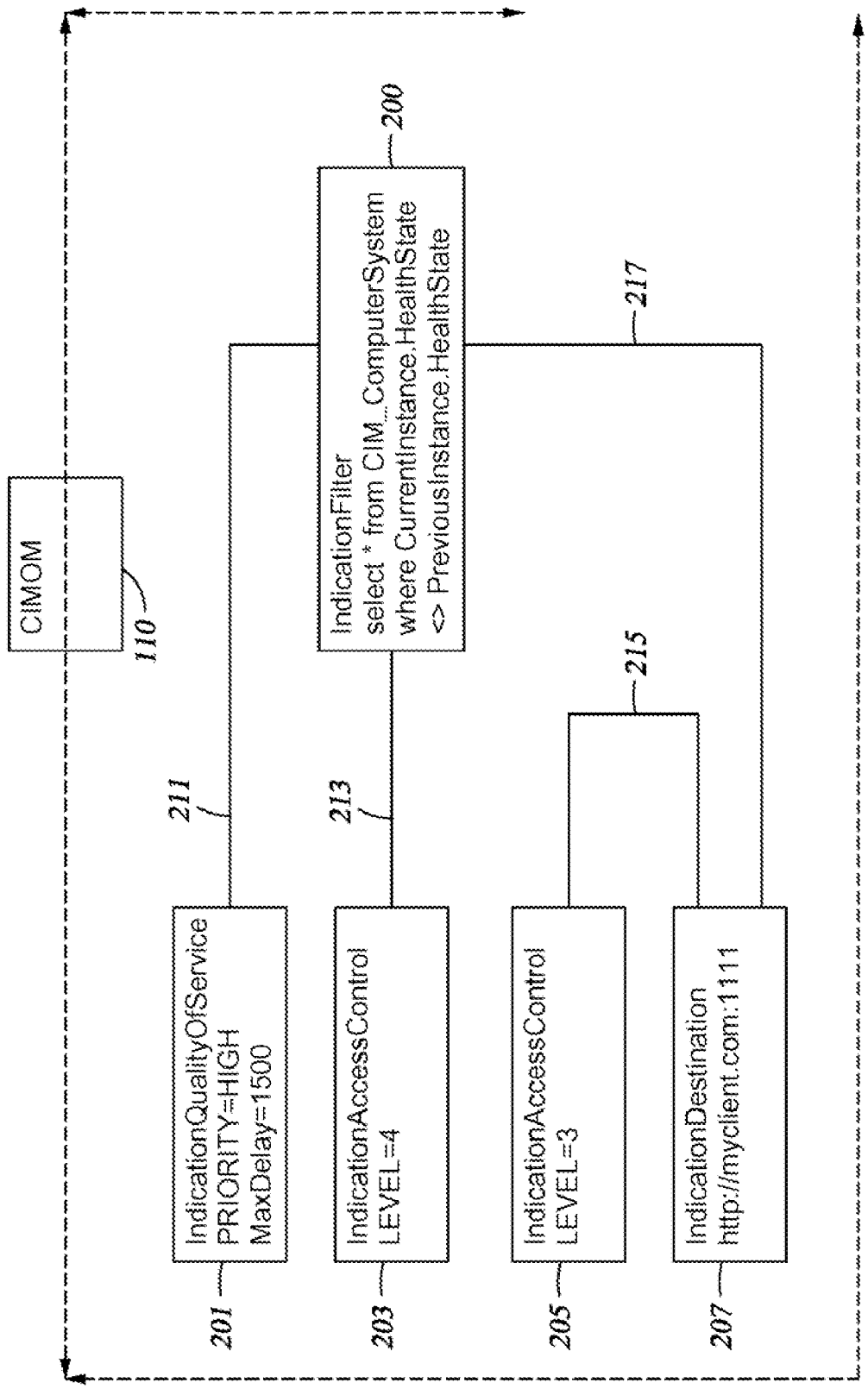
FIG. 2 is a schematic representation of an indication filter.

FIG. 2 is set forth for the purpose of explanation and not limitation, to provide a thorough understanding of one possible embodiment of the present disclosure. Shown in FIG. 2 is a schematic representation of a filter 200 arbitrarily named IndicationFilter. Publication of event 145 may be carried out by the creation of an instance of CIM_IndicationFilter, which may be a subclass of CIM_MangedElement. An instance of CIM_IndicationFilter is also referred to simply as a filter. This filter 200 comprises the query that selects the indication class or classes. By way of example in FIG. 2, the indication filter 200 may make a selection from the "CIM_CompterSystem" where the "CurrentInstance.HealthState" is not equal ("< >") to the "PreviousInstanceHealthState," that is, where there has been a change.

Filter 200 through association 211 with IndicationOualityOfService 201 may be provided the relative priority of handling and maximum delay in bundling indications. In the embodiment as shown in FIG. 2, the priority is shown as "High," and the maximum delay in bundling indications is shown as 1500 milliseconds.

Filter 200 may also be associated with two instances of IndicationAccessControl. In a first instance, filter 200 through association 213 with IndicationAccessControl 203 may be provided the level of access required for a client to receive the indication. In a second instance, filter 200 through association 215 with IndicationAccessControl 205 may be provided the current level of client access for subscriber destination 207 for any subscription 217.

Generally, CIMOM 110 processes the queries on behalf of providers 111 although providers 111 may be designed to handle queries directly. In a CIM environment, provider 111 may publish the indications. Client 105 may indicate a desire to be notified of CIM event 115 by subscribing to corresponding indication(s) 145. A subscription is generally expressed by creating an instance of CIM_IndicationSubscription.

The methods of the present disclosure may be implemented by: (1) creating a filter for an indication in the namespace; (2) creating an access control for the indication and associate it to the filter; and/or (3) creating a quality of service for the indication and associate it to one or more filters. Typically, (1) and (2) are implemented by provider 111, and (3) is implemented by either provider 111 or client 105. Of course, in some instances, client 105 may be allowed to implement (1) and (2).

CIMOM 110 may perform the following steps to implement the invention. At the time client 105 subscribes to indication 145, CIMOM 110 may create the access control for the client subscription. For each indication 125 that is 'fired' by provider 111, CIMOM 110 may examine the associated filter, security, and client subscriptions. CIMOM 110 may fire or withhold the indication according to the access control. CIMOM 110 may also fire or delay the indication according to the quality of service setting.

The present disclosure provides computer implemented methods of managing an information handling system, various embodiments of which may include monitoring the information handling system for an event, generating an indication in response to the event, providing the indication to all clients having a level of access sufficient for the indication, bundling indications together especially those having the same priority, assigning a priority to the event, providing the indication along with the priority, and/or any combinations thereof.

Access to indications may be limited through implementation of the methods, apparatus and products of the present disclosure. In one non-limiting embodiment, the computer implemented method for managing an information handling system includes one or more of the following steps: monitoring, with an object oriented model, the information handling system for an event; generating, with an object oriented model, an indication in response to the event; and, allowing access to the indication to clients having a client level of access which sufficient for an indication level of access of the indication. This embodiment may further include use of a CIM filter representing the indication, with the CIM filter associated with a CIM class comprising a first instance comprising the client level of access and a second instance comprising the indication level of access. This embodiment may also include instantiating the CIM class with the second instance comprising the indication level of access. This embodiment may further include accepting a definition for indication level of access.

Priority for indications may be generated through implementation of the methods, apparatus and products of the present disclosure. In one non-limiting embodiment, the computer implemented method for managing an information handling system includes one or more of the following steps: monitoring, with an object oriented model, the information handling system for an event; and generating, with an object oriented model an indication in response to the event wherein the indication comprises a priority for the event. This embodiment may include use of a CIM filter representing the indication, with the CIM fitter associated with a CIM class comprising an instance comprising the priority for the event. This embodiment may also include instantiating the CIM class with the priority for the event. This method may further include allowing clients access to the indication.

Bundling of indications may be accomplished through implementation of the methods, apparatus and products of the present disclosure. In one non-limiting embodiment, the computer implemented method for managing an information handling system includes one or more of the following steps: monitoring, with an object oriented model, the information handling system for an event of a first type; generating, with an object oriented model, an indication in response to the event; repeating the monitoring and generating steps until satisfaction of preset criteria, with each indication generated gathered into a single bundle; and allowing clients access to the bundle. This embodiment may also include use of a CIM filter representing the indication with the CIM filter associated with a CIM class comprising a first instance comprising the first type for the event, and a second instance comprising the preset criteria. This embodiment may also include instantiating the CIM class the first instance comprising the first type for the event, and the second instance comprising the preset criteria. The embodiment may also include accepting a definition for the first type.

For the above embodiments, the object oriented model may be a common information model (CIM), and/or the event comprises any change relating to the information handling system.

In non-limiting embodiments, part or all of the methods described herein may be described as instructions for an information handling system, and stored on media or transmitted by a propagated signal. In non-limiting embodiments, part or all of the data structures described herein may be stored on media or transmitted in a propagated signal.

In another non-limiting embodiment, an IHS may include computer readable media as described above including instructions embodying part or all of the methods described herein.

As utilized herein, "computer readable" and "computer implemented" should be understood to include "IHS readable" and "IHS implemented."

The present disclosure is to be taken as illustrative rather than as limiting the scope or nature of the claims below. Numerous modifications and variations will become apparent to those skilled in the art after studying the disclosure, including use of equivalent functional and/or structural substitutes for elements described herein, use of equivalent functional couplings for couplings described herein, and/or use of equivalent functional actions for actions described herein. Any insubstantial variations are to be considered within the scope of the claims below.

What is claimed is:

1. A computer implemented method for managing an information handling system (IHS), the method comprising:
monitoring, with an object oriented model, the information handling system for a plurality of events;
assigning, with the object oriented model, a first indication to the occurrence of a first event of the plurality of events wherein the indication comprises a security level for the first event;
assigning, with the object oriented model, a second indication to the first event of the plurality of events wherein the second indication comprises a priority order for the first event;
assigning, with the object oriented model, a second indication to a second event of the plurality of events wherein the second indication comprises a priority for the second event and bundling the events corresponding to the first and second indications in respective bundles; and
allowing access to the first event at the priority order indicated to clients having a sufficient client level of access for the security level of the event.

2. The method of claim 1, wherein the object oriented model is a common information model (CIM) and the priority for the an event is assigned by the IHS.

3. The method of claim 2, wherein the step of allowing access to the event comprises use of a CIM filter representing the indication, with the CIM filter associated with a CIM class comprising a first instance comprising the client level of access and a second instance comprising an indication level of access.

4. The method of claim 3, wherein prior to the step of allowing access to the event, the method comprises:
instantiating the CIM class with the second instance comprising the indication level of access for the event.

5. The method of claim 1, wherein prior to the step of allowing access to the event, the method comprises:
accepting a definition for an indication level of access for the event.

6. A computer implemented method of managing an information handling system (IHS), comprising:
monitoring, with an object oriented model, the information handling system for an event;
generating, with an object oriented model, an indication in response to the occurrence of the event wherein the indication comprises a priority for the event, wherein the priority for the event is determined by a property of an Indication Quality of Service class;
repeating the steps of monitoring and generating until satisfaction of preset criteria, the resulting events having the same indications being gathered into a single event bundle;
assigning, with the object oriented model, a security level to the event bundle; and
allowing access to the bundle to clients having a sufficient client level of security access for the event bundle.

7. The method of claim 6, wherein the object oriented model is a common information model (CIM) and the priority for an event is assigned by the IHS.

8. The method of claim 7, wherein the step of generating an indication comprises utilizing a filter representing the indication, with the filter associated with a CIM class comprising a first instance comprising the priority for the event, and a second instance comprising the preset criteria and the preset criteria is assigned by the IHS.

9. The method of claim 8, wherein prior to the step of generating an indication, the method comprises:
instantiating the CIM class with the priority for the event.

10. The method of claim 6, wherein the event comprises any change relating to the information handling system and the priority for an event is assigned by the IHS.

11. A computer implemented method of managing an information handling system (IHS), comprising:
A. monitoring, with an object oriented model, the information handling system for events of a first and second type;
B. generating, with an object oriented model, a first indication in response to the occurrence of a first event wherein the indication comprises a priority level for the event;
C. generating, with the object oriented model, a second indication in response to a second event wherein the indication comprises a priority level for the event;

D. repeating the steps of monitoring and generating for subsequent events until satisfaction of preset criteria, with each indication of step C sharing a priority level gathered into a single respective bundle, wherein each of the respective bundles is assigned a security level; and allowing access to the respective bundles to clients having a sufficient client level of access for the security level of the event bundle.

12. The method of claim 11, wherein the object oriented model is a common information model (CIM) and the priority for an event bundle is assigned by the IHS.

13. The method of claim 12, wherein the step of generating an indication comprises use of a CIM filter representing the indication, with the CIM filter associated with a CIM class comprising a first instance comprising the first type for the event, and a second instance comprising the preset criteria and the preset criteria is assigned by the IHS.

14. The method of claim 13, wherein prior to the step of generating an indication, the method comprises:

instantiating the CIM class the first instance comprising the first type for the event, and the second instance comprising the preset criteria.

15. The method of claim 11, wherein the event comprises any change relating to the information handling system and the priority and security level for an event is assigned by the IHS.

16. The method of claim 11, wherein prior to the step of monitoring the information handling system, the method comprises:

accepting a definition for the events, the priority to be assigned to an event and the security level to be assigned to an event as assigned by the IHS.

* * * * *